(12) United States Patent
Song et al.

(10) Patent No.: US 10,200,212 B2
(45) Date of Patent: Feb. 5, 2019

(54) ACCESSING IP NETWORK AND EDGE DEVICES

(71) Applicant: Hewlett Packard Enterprise Development LP, Houston, TX (US)

(72) Inventors: Xiaoheng Song, Beijing (CN); Guoliang Zheng, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 626 days.

(21) Appl. No.: 14/372,835

(22) PCT Filed: Apr. 17, 2013

(86) PCT No.: PCT/CN2013/074287
§ 371 (c)(1),
(2) Date: Jul. 17, 2014

(87) PCT Pub. No.: WO2013/155959
PCT Pub. Date: Oct. 24, 2013

(65) Prior Publication Data
US 2015/0010003 A1    Jan. 8, 2015

(30) Foreign Application Priority Data
Apr. 20, 2012  (CN) .......................... 2012 1 0118214

(51) Int. Cl.
*H04L 12/46* (2006.01)
*H04L 12/721* (2013.01)
*H04L 12/741* (2013.01)

(52) U.S. Cl.
CPC ...... *H04L 12/4654* (2013.01); *H04L 12/4662* (2013.01); *H04L 45/66* (2013.01); *H04L 45/745* (2013.01)

(58) Field of Classification Search
None
See application file for complete search history.

(56) References Cited

U.S. PATENT DOCUMENTS 8,718,057 B1 * 5/2014 Rabie .................. H04L 12/2852
370/390
2006/0056384 A1 * 3/2006 Ishii ........................ H04L 45/50
370/351

(Continued)

FOREIGN PATENT DOCUMENTS

CN     1852240    10/2006
CN     101043395   9/2007

(Continued)

OTHER PUBLICATIONS

International Search Report and Written Opinion dated Jul. 25, 2013 issued on PCT Patent Application No. PCT/CN2013/07287 dated Apr. 17, 2013, The State Intellectual Property Office, the P.R. China.

(Continued)

*Primary Examiner* — Ayaz Sheikh
*Assistant Examiner* — Sori Aga
(74) *Attorney, Agent, or Firm* — Trop, Pruner & Hu, P.C.

(57) ABSTRACT

The present disclosure provides a method and an edge device for accessing an IP network. A record is pre-configured to associate and record a port number, a VLAN ID and an EVI service instance ID in the record. A first packet is received from a user side. A corresponding EVI service instance ID is searched in the record according to a port number of a port through which the first packet is received, and a VLAN ID of the first packet. The first packet is then forwarded in an EVI service instance corresponding to the EVI service instance ID.

18 Claims, 3 Drawing Sheets

(56) References Cited

U.S. PATENT DOCUMENTS

| | | | |
|---|---|---|---|
| 2008/0031263 A1* | 2/2008 | Ervin | H04L 12/4641 370/397 |
| 2009/0010265 A1* | 1/2009 | Vishnubhotla | H04L 12/2856 370/395.53 |
| 2010/0106791 A1* | 4/2010 | Dai | H04L 12/465 709/206 |

FOREIGN PATENT DOCUMENTS

| | | |
|---|---|---|
| CN | 102611634 | 7/2012 |
| EP | 1777887 A1 | 4/2007 |

OTHER PUBLICATIONS

Office Action received GB patent application No. 1413348.2, dated Sep. 14, 2018, 4 pages.

\* cited by examiner

ACCESSING IP NETWORK AND EDGE DEVICES

CROSS-REFERENCE TO RELATED APPLICATION

The present application is a 371 application of International Application No. PCT/CN2013/074287 filed on Apr. 17, 2013 and entitled "Accessing IP Network and Edge Devices," which claims benefit of Chinese Patent App. No. CN 201210118214.X filed on Apr. 20, 2012.

BACKGROUND

An Ethernet Virtual Interconnect (EVI) network includes a core network and a site network. The site network includes an edge network, i.e., a network between convergence devices and edge devices, and an access network, i.e. a network between access devices and convergence devices. The EVI extends Virtual Local Area Networks (VLANs) to different sites. Independent EVI service instances consist of these extended VLANs. Each EVI service instance is identified by a Network ID to number the EVI service instances globally and uniformly. Intra-VLAN forwarding of different EVI service instances on a device may be isolated from each other.

BRIEF DESCRIPTION OF THE DRAWINGS

Features of the present disclosure are illustrated by way of example and not limited in the following figure(s), in which like numerals indicate like elements, in which.

DETAILED DESCRIPTION

Conventionally, a VLAN ID is used as a service identifier to uniquely identify an EVI service instance. For a large number of users, an edge device has to store a large number of VLAN IDs to allow access to different EVI service instances. However, since edge devices have limited VLAN resources, the number of VLAN IDs and corresponding EVI service instances that can be supported is also limited.

The present disclosure provides a method for accessing an IP network, when applied to an EVI network. A record is pre-configured to associate and record a port number, a VLAN ID and an EVI service instance ID in the record. This allows the EVI service instance to be identified according to both the port number and the VLAN ID in the record.

Using both the port number and VLAN ID to identify EVI service instances, the edge device is able to support more EVI network access modes. Compared to the conventional case where a VLAN ID uniquely identifies an EVI service instance (i.e. different VLAN IDs identifying different EVI service instances), the same VLAN ID may be used to identify different EVI service instances by also taking into account the port number of a port through which a packet is received. Therefore, according to an example of the present disclosure, packets of the same VLAN ID and received through different ports may be forwarded in the same EVI service instance, or in different EVI service instances.

Since a large number of VLAN IDs may not be required according to the example of the present disclosure, VLAN resources allocated to an edge device may be saved. The same amount of limited VLAN resources (e.g. 4K) may be used to support more users of different VLANs for accessing the EVI network. Since more users can be supported, this also facilitates access of large-scale enterprise users.

For simplicity and illustrative purposes, the present disclosure is described by referring mainly to example(s) thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Figure 1:
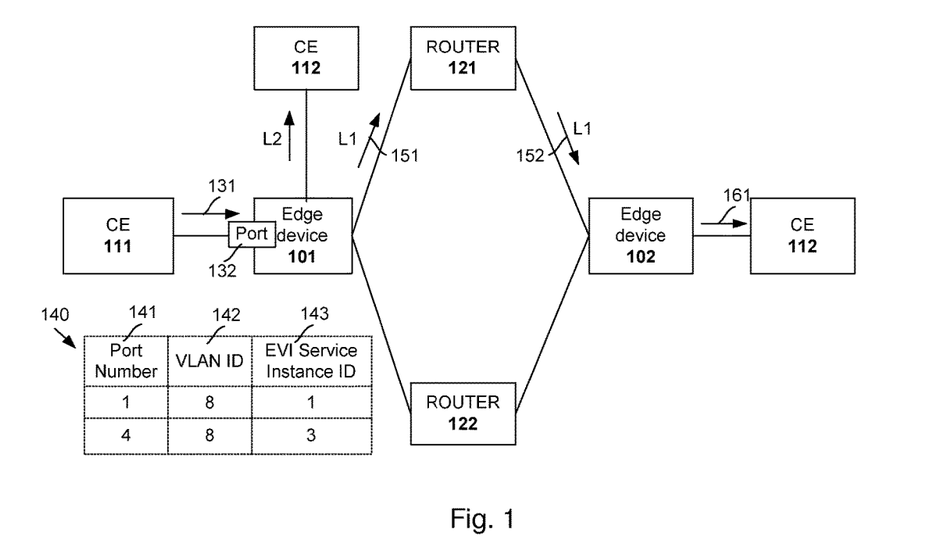
FIG. 1 is a schematic diagram illustrating structure of an IP network in the form of an EVI network in accordance with an example of the present disclosure.

Referring to FIG. 1, FIG. 1 is a schematic diagram illustrating structure of an example EVI network. In FIG. 1, an edge device 101 and an edge device 102 are edge devices of the EVI network, and are used for forwarding packets from a user side to a public network and forwarding packets from the public network to the user side. Router 121 and Router 122 perform IP network forwarding. CE 111 and CE 112 are user or customer edge devices of the EVI network.

In general, the edge device 101 receives a packet from the CE 111, executes local layer 2 (L2) forwarding in an EVI service instance, searches for a Media Access Control (MAC) table via a destination MAC address of the packet, obtains output interface information and encapsulation information, and forwards the packet. There are generally three scenarios:

If the output interface is a public network, the packet is taken as a load, encapsulated into an IP GRE tunnel, and sent to the public network via a layer 1 (L1) path (e.g. path between edge device 101 and router 121).

If the output interface is the user side, the packet is forwarded to a corresponding user side port, such as to the CE 112 via a L2 path (e.g. path between edge device 101 and CE 112).

If the destination MAC address of the packet is not found in the destination MAC table, the packet is broadcast in accordance with relevant regulations or protocols.

Figure 2:
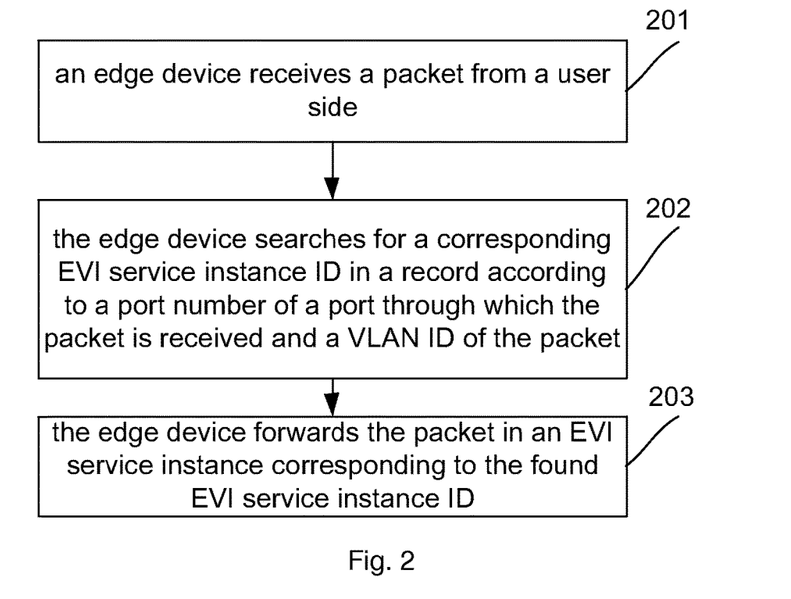
FIG. 2 is a flow chart illustrating a method for accessing an Internet Protocol (IP) network in accordance with an example of the present disclosure.

Referring to FIG. 2, FIG. 2 is a flow chart illustrating a method for accessing an IP network in accordance with an example of the present disclosure. The method includes the following blocks, which will be discussed using the example in FIG. 1.

At block 201, an edge device (e.g. 101) receives a packet 131 from a user side (e.g. CE 111).

At block 202, the edge device (e.g. 101) searches for a corresponding EVI service instance ID in a record (e.g. 140)

according to (i) a port number of the port through which the packet is received 132 and (ii) a VLAN ID of the packet 131.

The record 140 in FIG. 1 is pre-configured at the edge device 101 prior to receiving the packet 131. A port number 141, VLAN ID 142 and EVI service instance ID 143 are associated (or 'bound together') and recorded in the record 140. The record 140 is shown in dotted line in FIG. 1 to indicate that it is not a physical entity in the network.

By searching based on both the port number and VLAN ID, different EVI service instances may be identified based on the same VLAN ID. For example, if the VLAN ID of the received packet is 8 and the packet is received through port number 1, the corresponding EVI service instance ID is 1. For a packet of the same VLAN ID 8 but received through a different port number (e.g. 4), the corresponding EVI service instance ID is different (e.g. 3).

The term "VLAN ID of the packet" used here includes VLAN ID carried by the packet, or VLAN ID not carried by the packet. In the latter case, the VLAN ID of the packet may be a VLAN ID of a default VLAN.

In more detail, the packet received by the edge device may carry a single-layer VLAN field, or a multiple-layer VLAN field, or may not carry the VLAN field at all. The EVI service instance ID may be determined according to the VLAN ID(s) of the received packet as follows.

If the packet carries a single-layer VLAN ID, the edge device searches for the EVI service instance ID in the record according to (i) the port number of the port through which the packet is received, and (ii) the single-layer VLAN ID carried by the packet.

If the packet carries a multiple-layer VLAN ID, the edge device searches for the EVI service instance ID in the record according to (i) the port number of the port through which the packet is received and (ii) the multiple-layer VLAN ID carried by the packet.

If the received packet does not carry a VLAN ID, the edge device searches for the EVI service instance ID in the record according to (i) the port number of the port through which the packet is received, and (ii) the VLAN ID of a VLAN to which the port through which the packet is received belongs by default (i.e. VLAN ID of the default VLAN).

At block 203, the edge device (e.g. 101) forwards the packet (e.g. 131) in an EVI service instance corresponding to the found EVI service instance ID.

If the packet is to be forwarded to the public network (e.g. via L1 path between edge device 101 and router 121), IP General Router Encapsulation (GRE) is performed to encapsulate the packet with the EVI service instance ID. In one example, after determining the EVI service instance ID, the edge device searches for a MAC address in the EVI service instance corresponding to the EVI service instance ID.

If a corresponding output port, which is found in a MAC table using the destination MAC address of the packet, is a tunnel interface, it is determined that the packet is to be forwarded to the public network. IP GRE is performed for the packet to form an IP GRE tunnel. In the present disclosure, an EVI identity is encapsulated in the process of encapsulating the IP GRE tunnel. The EVI Identity is added to a protocol type field after the GRE header of the encapsulated IP GRE tunnel. The EVI identity includes the EVI service instance ID and a packet type identity. The encapsulated packet (e.g. 151 in FIG. 1) is sent to the public network.

Referring to the examples in the accompanying drawings, the packet may be forwarded to the public network as follows.

Figure 3:
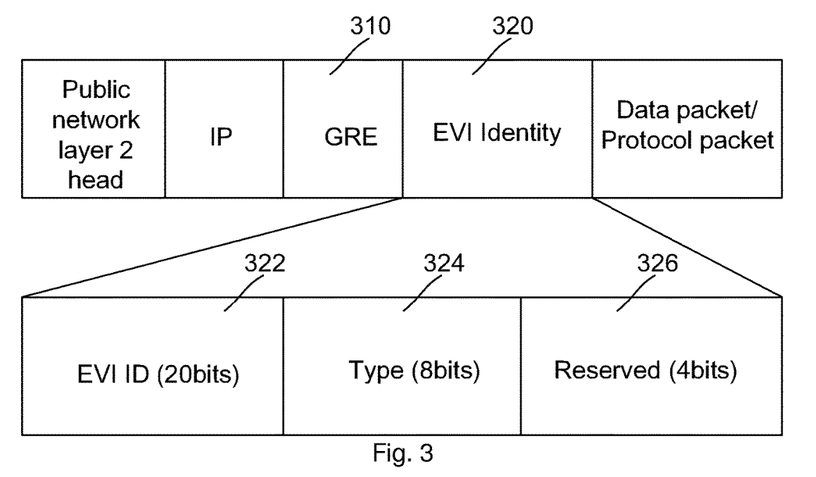
FIG. 3 is a schematic diagram illustrating format of an extended IP Generic Routing Encapsulation (GRE) tunnel packet in accordance with an example of the present disclosure.

FIG. 3 is a schematic diagram illustrating format of an extended IP GRE tunnel packet in accordance with an example of the present disclosure. As shown in FIG. 3, in this disclosure, the conventional IP GRE tunnel is extended. An EVI Identity field 320 is added after a GRE header 310, to identify the EVI service instance to which the packet belongs.

Furthermore, in order to identify that the field after the IP GRE tunnel 310 is the EVI Identity field 320, a protocol type of the IP GRE tunnel is extended. For example, a field with the protocol type of 0x6559 is added to identify that the field following the IP GRE tunnel field 310 is the EVI Identity field 320. The EVI Identity field includes an EVI ID field 322 (e.g. 20 bits), a Type field 324 (e.g. 8 bits) and a Reserved field 326 (e.g. 4 bits). The EVI ID field 322 is used for identifying the EVI service instance ID, and is configured uniquely in the EVI network. The Type field 324 is a packet type identity and is used for identifying the type of the transmitted packet. The transmitted packet may be a data packet or a protocol packet. The Reserved field 326 is used for identifying a reserved field.

Processing Encapsulated Packets

If an edge device (e.g. 102 in FIG. 1) receives an encapsulated packet (e.g. 152 in FIG. 1) from the network side, the edge device obtains an IP GRE tunnel carried by the packet, and the EVI Identity according to the protocol type of the IP GRE tunnel.

It is then determined whether the packet, after decapsulation, is a protocol packet or data packet according to the packet type identity 324 in the EVI Identity.

If it is determined that the decapsulated packet is a protocol packet, the decapsulated packet is processed by the edge device, e.g. sent to a CPU.

If it is determined that the decapsulated packet is a data packet, layer 2 forwarding is performed for the decapsulated packet in the EVI service instance corresponding to the EVI service instance ID in the obtained EVI Identity.

In the examples of the present disclosure, the port number, VLAN ID and EVI service instance ID are associated together and recorded in a record. The port number in the record may be a single port number and/or port number range, and the VLAN ID in the record may be a single VLAN ID and/or VLAN ID range.

The VLAN ID range may further include an outer VLAN ID range and an inner VLAN ID range. Therefore, the EVI service instance may be determined according to the first VLAN ID when the packet from the user side carries the multiple-layer VLAN ID. The present disclosure provides multiple example methods for associating and recording port number(s), VLAN ID(s) and EVI service instance(s) to identify the EVI service instances. In practice, a suitable method for identifying the EVI service instance may be selected flexibly depending on actual requirements.

In the following non-limiting embodiments, it is assumed that physical port number of the edge device (e.g. 101 in FIG. 1) ranges from 1 to 4 and the VLAN ID ranges from 1 to 10. The physical port number and VLAN ID may be associated together in a record and used for identifying 3 EVI service instances, for example. Each record is described hereafter in detail according to examples.

Embodiment One

Referring to table 1, a single port number and a single VLAN ID may be used for identifying an EVI service instance.

TABLE 1

| EVI service instance ID | Single port number | Single VLAN ID |
|---|---|---|
| 1 | 1 | 1, 2, 8 |
| 2 | 2 | 3, 4, 6, 7 |
| 3 | 3 | 4, 5, 9, 10 |
|   | 4 | 1, 6, 8, 10 |

Port number 1 in table 1 is respectively associated with VLAN IDs 1, 2 and 8 for identifying the EVI service instance with ID 1. Port number 2 is respectively associated with VLAN IDs 3, 4, 6 and 7 for identifying the EVI service instance with ID 2. Port number 3 is respectively associated with VLAN IDs 4, 5, 9 and 10 for identifying the EVI service instance with ID 3. Port number 4 is respectively associated with VLAN IDs 1, 6, 8 and 10 for identifying the EVI service instance with ID 3.

It can be seen from table 1 that the same VLAN ID may be associated with different port numbers for identifying different EVI service instances or the same EVI service instance. Some examples are discussed below:

Port number 1 is associated with VLAN ID 8, and port number 4 is associated with the same VLAN ID 8 for identifying different EVI service instances with ID 1 and ID 3 respectively (as previously discussed with reference to FIG. 1).

Port number 2 is associated with VLAN ID 4 and port number 3 is associated with the same VLAN ID 4 for identifying different EVI service instances with ID 2 and ID 3 respectively.

Port number 3 is associated with VLAN ID 10 and port number 4 with the same VLAN ID 10 for identifying the same EVI service instance with ID 3.

Embodiment Two

Referring to table 2, an EVI service instance may be identified by a single port number and a VLAN ID range.

TABLE 2

| EVI service instance ID | Single port number | VLAN ID range |
|---|---|---|
| 1 | 1 | [1, 3]; [8, 9] |
| 2 | 2 | [4, 6] |
| 3 | 3 | [5, 8] |
|   | 4 | [9, 10] |

As shown in table 2, port number 1 and the VLAN ID ranges [1, 3] and [8, 9] are associated together to identify the EVI service instance with ID 1. Port number 2 and VLAN ID range [4, 6] are associated together to identify the EVI service instance with ID 2. Port number 3 and the VLAN ID range [5, 8] are associated together to identify the EVI service instance with ID 3. Port number 4 and the VLAN ID range [9, 10] are associated together to identify the EVI service instance with ID 3.

Embodiment Three

Referring to table 3, an EVI service instance may be identified by a port number range and a single VLAN ID.

TABLE 3

| EVI service instance ID | Port number range | Single VLAN ID |
|---|---|---|
| 1 | [2, 4] | 1, 2, 8 |
| 2 | [3, 4] | 3, 4, 6, 7 |
| 3 | [1, 2] | 4, 5, 9, 10 |

Embodiment Four

Referring to table 4, an EVI service instance may be identified by a port number range and a VLAN ID range.

TABLE 4

| EVI service instance ID | Port number range | VLAN ID range |
|---|---|---|
| 1 | [2, 4] | [1, 3]; [8, 10] |
| 2 | [3, 4] | [4, 6] |
| 3 | [1, 2] | [5, 8] |

Embodiments one (1) to four (4) respectively describe how to identify an EVI service instance with (1) single port number and single VLAN ID, (2) single port number and an VLAN ID range, (3) port number range and single VLAN ID and (4) port number range and VLAN ID range. In practice, the single port number and the port number range may be mixed (i.e. includes both single port number and port number range), and the single VLAN ID and the VLAN ID range may be mixed to identify the EVI service instance ID. For simplicity, the 'mixed' scenarios are not listed in this disclosure.

Embodiment Five

A VLAN ID range may include an outer VLAN ID range and an inner VLAN ID range. Referring to table 5, an EVI service instance may be identified by associated single port number, outer VLAN ID range and inner VLAN ID range.

TABLE 5

| EVI service instance ID | Single port number | Outer VLAN ID range | Inner VLAN ID range |
|---|---|---|---|
| 1 | 1 | [3, 5]; [9, 10] | [1, 1]; [9, 10] |
| 2 | 2 | [1, 2] | [2, 5] |
| 3 | 3, 4 | [6, 8] | [6, 8] |

In table 5, port number 1, outer VLAN ID ranges [3, 5] and [9, 10], and inner VLAN ID ranges [1, 1] and [9, 10] are associated together to identify the EVI service instance with ID 1. Port number 2, outer VLAN ID range [1, 2] and inner VLAN ID range [2, 5] are associated together to identify the EVI service instance with ID 2. Port numbers 3 and 4, outer VLAN ID range [6, 8], and inner VLAN ID range [6, 8] are associated together to identify the EVI service instance with ID 3. In practice, the port number range may be associated together with an outer VLAN ID range and an inner VLAN ID range to identify an EVI service instance.

When the received packet carries a multiple-layer VLAN ID, the corresponding port number may be searched for in the record according to the port number of the port through which the packet is received. The corresponding outer VLAN ID range may be searched for in the record according to the outer VLAN ID carried by the received packet. The corresponding inner VLAN ID range may be searched for in the record according to the inner VLAN ID carried by the packet. The EVI service instance ID may be searched for according to the found port number, the outer VLAN ID range and the inner VLAN ID range.

If the multiple-layer VLAN ID carried by the packet is for more than two layers, the outer VLAN ID is referred to as the first VLAN ID carried by the packet, and the inner VLAN ID is a second VLAN ID. Alternatively, the outer VLAN ID is referred to as the second VLAN ID and the inner VLAN ID is the innermost VLAN ID. Or, rules for determining the outer VLAN ID and the inner VLAN ID may be determined according to actual situations.

In practice, the user may configure modes for determining the EVI service instance according to actual needs. The above five examples are partial of the modes, which are not listed here.

Figure 4:
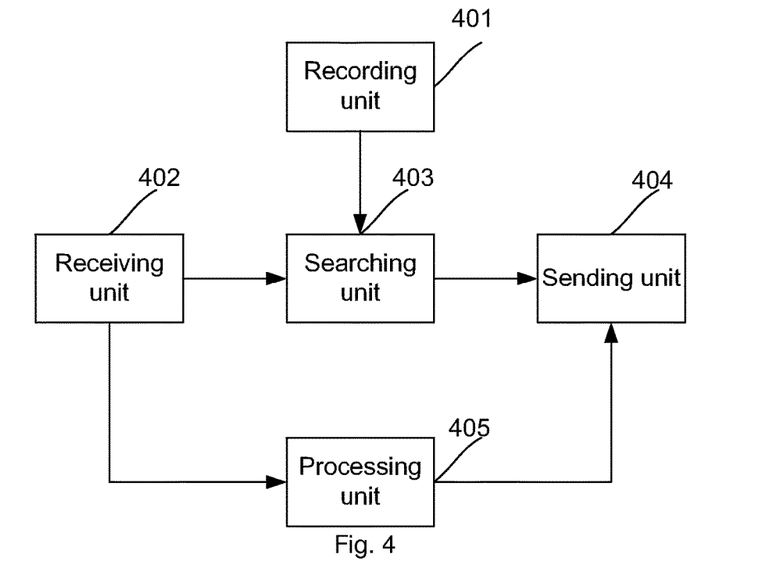
FIG. 4 is a schematic diagram illustrating structure of an edge device capable of accessing an IP network in accordance with an example of the present disclosure.

The present disclosure further provides a device, applied to an EVI network. Referring to FIG. 4, FIG. 4 is a schematic diagram illustrating structure of an edge device capable of performing the above method in accordance with an example of the present disclosure. The edge device includes a recording unit 401, a receiving unit 402, a searching unit 403 and a sending unit 404.

The recording unit 401 is to associate and record a port number, a VLAN ID, and an EVI service instance ID to form a record.

The receiving unit 402 is to receive a packet from a user side.

The searching unit 403 is to search for, when the receiving unit 402 receives the packet from the user side, a corresponding EVI service instance ID in the record in the record unit 401 according to a port number of a port through which the packet is received, and the VLAN ID carried by the packet.

The sending unit 404 is to forward the received packet in an EVI service instance corresponding to the EVI service instance ID found by the searching unit 403.

The port number in the record may be a single port number and/or port number range. The VLAN ID in the record may be a single VLAN ID and/or VLAN ID range.

The searching unit is to search for, when the packet received by the receiving unit 402 carries a multiple-layer VLAN ID, the corresponding EVI service instance ID in the record unit 401 according to the port number of the port through which the packet is received and the multiple-layer VLAN ID carried by the packet.

The searching unit 403 is to search for, when the packet received by the receiving unit 402 does not carry a VLAN ID, the corresponding EVI service instance ID in the record unit 401 according to the port number of the port through which the packet is received, and a VLAN ID of a default VLAN, i.e. the VLAN to which the port, through which the packet is received, belongs by default.

The VLAN ID range in the record may include an outer VLAN ID range and an inner VLANID range.

The searching unit 403 is further to search for, when the packet received by the receiving unit 402 carries a multiple-layer VLAN ID, a corresponding port number in the record in the record unit 401 according to the port number of the port through which the packet is received, a corresponding outer VLAN ID range in the record in the record unit 401 according to the outer VLAN ID carried by the packet, a corresponding inner VLAN ID range in the record in the record unit 401 according to the inner VLAN ID carried by the packet, and a corresponding EVI service instance ID according to the found port number, the outer VLAN ID range and the inner VLAN ID range. For example, the outer VLAN ID is the first VLAN ID carried by the packet and the inner VLAN ID is the second VLAN ID.

The sending unit 404 is to perform, when it is determined that the packet is forwarded to the public network, IP GRE for the packet to form an IP GRE tunnel, encapsulate the EVI Identity, and send the encapsulated packet to the public network. The EVI Identity is added to a protocol type field after a GRE header of the encapsulated IP GRE tunnel. The EVI Identity includes an EVI service instance ID and a packet type identity.

The edge device further includes a processing unit 405.

The receiving unit 402 is to receive a packet from the network side.

The processing unit is to obtain, when the receiving unit 402 receives the packet from the network side, an IP GRE tunnel from the packet; obtain the EVI Identity according to the protocol type of the IP GRE tunnel: and determine the type of the decapsulated packet according to the packet type identity in the obtained EVI Identity. For example, the decapsulated packet may be a protocol packet or a data packet.

The sending unit 404 is further to:

send, if the decapsulated packet is determined as a protocol packet, the decapsulated packet to the CPU, or perform, if the decapsulated packet is determined as a data packet, layer 2 forwarding for the decapsulated packet in the EVI service instance corresponding to the EVI service instance ID in the obtained EVI Identity.

Figure 5:
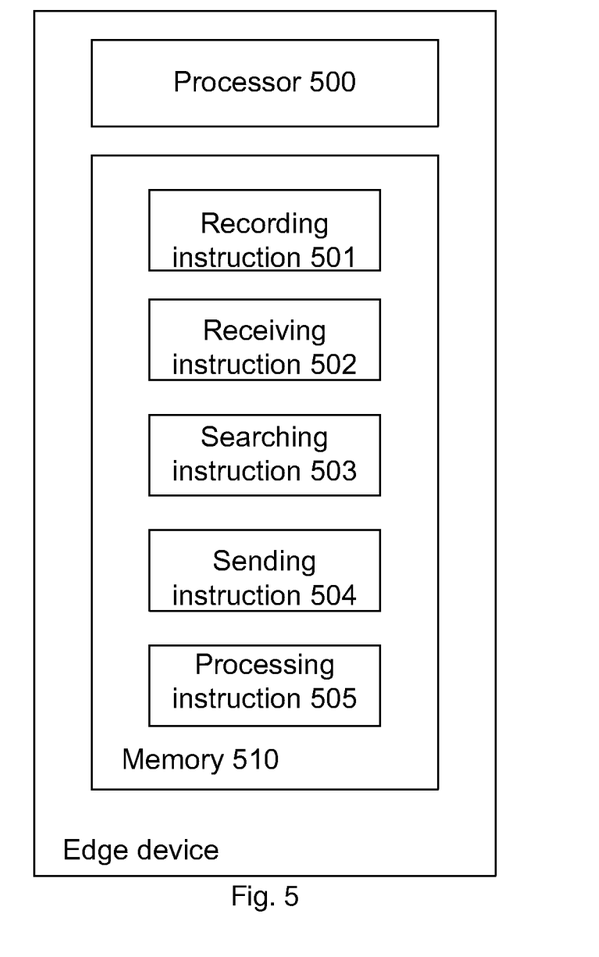
FIG. 5 is a schematic diagram illustrating structure of another edge device capable of accessing an IP network in accordance with an example of the present disclosure.

The present disclosure provides another edge device for accessing an EVI network according to another example in FIG. 5. The edge device in FIG. 5 includes a processor 500 and a memory 510.

The processor 500 communicates with the memory 510, and executes instructions stored in the memory 510. The memory 510 stores a recording instruction 501, a receiving instruction 502, a searching instruction 503 and a sending instruction 504.

The recording instruction 501 is to configure or pre-configure a record by associating and recording a port number, a VLAN ID, and an EVI service instance ID in the record.

The receiving instruction 502 is to receive a packet from a user side.

The searching instruction 503 is to search for, when the receiving instruction 502 receives the packet from the user side, a corresponding EVI service instance ID in the record according to a port number of a port through which the packet is received, and a VLAN ID of the packet.

The sending instruction 504 is to forward the received packet in an EVI service instance corresponding to the EVI service instance ID.

The port number in the record may be a single port number and/or port number range. The VLAN ID in the record may be a single VLAN ID and/or VLAN ID range.

The searching instruction 503 is to search for, when the received packet carries a multiple-layer VLAN ID, the corresponding EVI service instance ID in the record according to the port number of the port through which the packet is received, and the multiple-layer VLAN ID carried by the packet.

The searching instruction 503 is to search for, when the packet does not carry a VLAN ID, the corresponding EVI service instance ID in the record according to the port number of the port, through which the packet is received, and a VLAN ID of a default VLAN, i.e. the VLAN to which the port, through which the packet is received, belongs by default.

The VLAN ID range in the record may include the outer VLAN ID range and the inner VLAN ID range.

The searching instruction 503 is further to search for, when the received packet carries a multiple-layer VLAN ID:
- a corresponding port number in the record according to the port number of the port, through which the packet is received,
- a corresponding outer VLAN ID range in the record according to the outer VLAN ID carried by the packet,
- a corresponding inner VLAN ID range in the record according to the inner VLAN ID carried by the packet, and
- a corresponding EVI service instance ID according to the found port number, the outer VLAN ID range and the inner VLAN ID range.

The outer VLAN ID may be the first VLAN ID carried by the packet and the inner VLAN ID the second VLAN ID.

The sending instruction 504 is to perform, when it is determined that the packet is forwarded to the public network, IP GRE for the packet to form an IP GRE tunnel, encapsulate the first packet with EVI Identity, and send the encapsulated packet to the public network. The EVI Identity is added to a protocol type field after the GRE header of the encapsulated IP GRE tunnel. The EVI Identity includes an EVI service instance ID and a packet type identity.

The memory 510 further includes a processing instruction 505.

The receiving instruction 502 is to receive a packet from the network side.

The processing instruction 505 is to obtain, when the receiving instruction 502 receives the packet from the network side, an IP GRE tunnel from the packet; obtain the EVI Identity according to the protocol type of the IP GRE tunnel; and determine the type of the decapsulated packet according to the packet type identity in the obtained EVI Identity.

The sending instruction 504 is to:
- send, if the decapsulated packet is determined as a protocol packet by the processing instruction 505 according to the packet type identity in the obtained EVI Identity, the decapsulated packet to the CPU, and
- perform, if the decapsulated packet is determined as a data packet according to the packet type identity in the obtained EVI Identity, layer 2 forwarding for the decapsulated packet in the EVI service instance corresponding to the EVI service instance ID in the obtained EVI Identity.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for accessing an Internet Protocol (IP) network, applied to an Ethernet Virtual Interconnect (EVI) network, the method comprising:
   receiving, at a port of an edge device, a first packet from a user side of the EVI network comprising a plurality of EVI service instances that comprise network paths between sites;
   responsive to the first packet not carrying a Virtual Local Area Network (VLAN) ID, determining a VLAN ID of the first packet as a VLAN ID of a default VLAN to which the port, through which the first packet is received, belongs;
   searching, by the edge device, for a corresponding EVI service instance ID in a record according to a port number of the port through which the first packet is received and the VLAN ID of the default VLAN, the record comprising a plurality of entries, an entry of the plurality of entries comprising a respective port number, a respective VLAN ID, and a respective EVI service instance ID, the entries of the record associating different EVI service instance IDs that identify corresponding EVI service instances via combinations of VLAN IDs and port numbers; and
   in response to locating the corresponding EVI service instance ID in the record, forwarding, by the edge device, the first packet in an EVI service instance identified by the corresponding EVI service instance ID.

2. The method according to claim 1, wherein the port number in an entry of the record is a single port number or a port number range, and the VLAN ID in an entry of the record is a VLAN ID or a VLAN ID range.

3. The method according to claim 1, further comprising:
   receiving, at the port of the edge device, a second packet from the user side of the EVI network, wherein the second packet carries a second VLAN ID;
   searching, by the edge device, for a further EVI service instance ID in the record according to the port number of the port through which the second packet is received and the second VLAN ID carried by the second packet; and
   in response to locating the further EVI service instance ID in the record, forwarding, by the edge device, the second packet in an EVI service instance identified by the further EVI service instance ID.

4. The method according to claim 3, wherein an entry of the record includes an outer VLAN ID range and an inner VLAN ID range; and
   wherein responsive to the received second packet carrying a multiple-layer VLAN ID, the searching for the further EVI service instance ID in the record comprises:
   searching for a corresponding port number in the record according to the port number of the port through which the second packet is received,
   searching for the corresponding outer VLAN ID range in the record according to an outer VLAN ID carried by the second packet,
   searching for the corresponding inner VLAN ID range in the record according to an inner VLAN ID carried by the second packet, and
   searching for the further EVI service instance ID according to the corresponding port number, the corresponding outer VLAN ID range, and the corresponding inner VLAN ID range.

5. The method according to claim 1, wherein the forwarding of the first packet in the EVI service instance identified by the corresponding EVI service instance ID comprises:
   if it is determined that the first packet is to be forwarded to a public network, performing IP Generic Routing Encapsulation (GRE) for the first packet to form an IP GRE tunnel, encapsulating the first packet with a first EVI Identity, and sending the encapsulated first packet to the public network.

6. The method according to claim 5, further comprising, if a second packet is received from a network side:
  decapsulating the second packet;
  obtaining an IP GRE tunnel carried by the second packet;
  obtaining a second EVI Identity according to a protocol type of the obtained IP GRE tunnel;
  determining whether the decapsulated second packet is a protocol packet or data packet according to a second packet type identity in the second EVI Identity;
  if the decapsulated second packet is a protocol packet, sending the decapsulated second packet to a CPU; and
  if the decapsulated second packet is a data packet, performing layer 2 forwarding for the decapsulated second packet in an EVI service instance corresponding to an EVI service instance ID in the second EVI Identity.

7. An edge device comprising:
a processor; and
a memory storing instructions that when executed by the processor cause the processor to:
  pre-configure a record comprising a plurality of entries, an entry of the plurality of entries associating a port number, an outer Virtual Local Area Network (VLAN) ID, an inner VLAN ID, and an EVI service instance ID;
  receive, at a port of the edge device, a first packet from a user side of an Ethernet Virtual Interconnect (EVI) network comprising a plurality of EVI service instances that comprises network paths between sites;
  search for a corresponding EVI service instance ID in the record according to a port number of the port through which the first packet is received and a multiple-layer VLAN ID of the first packet, the multiple-layer VLAN ID comprising an outer VLAN ID and an inner VLAN ID, wherein the entries of the record associate different EVI service instance IDs that identify corresponding different EVI service instances of the EVI network via combinations of outer and inner VLAN IDs and port numbers; and
  forward the first packet in an EVI service instance identified by the corresponding EVI service instance ID.

8. The edge device according to claim 7, wherein the port number in an entry of the record is a single port number or port number range, and each of the outer VLAN ID and inner VLAN ID in an entry of the record is a single VLAN ID or VLAN ID range.

9. The edge device according to claim 7, wherein the instructions when executed cause the processor to:
  receive, at the port of the edge device, a second packet that does not carry a VLAN ID;
  responsive to the second packet not carrying a VLAN ID, determine the VLAN ID of the second packet as a VLAN ID of a default VLAN to which the port, through which the second packet is received, belongs; and
  search for a further EVI service instance ID in the record according to the port number of the port through which the second packet is received and the VLAN ID of the default VLAN.

10. The edge device according to claim 8, wherein an entry of the record comprises an outer VLAN ID range and an inner VLAN ID range; and the instructions are to cause the processor to search for, responsive to the first packet carrying the multiple-layer VLAN ID:
  a corresponding port number in the record according to the port number of the port through which the first packet is received,
  a corresponding outer VLAN ID range in the record according to the outer VLAN ID carried by the first packet,
  a corresponding inner VLAN ID range in the record according to the inner VLAN ID carried by the first packet, and
  the corresponding EVI service instance ID according to the corresponding port number, the corresponding outer VLAN ID range, and the corresponding inner VLAN ID range.

11. The edge device according to claim 7, wherein the instructions are to cause the processor to:
  if it is determined that the first packet is to be forwarded to a public network, perform an IP Generic Routing Encapsulation (GRE) for the first packet to form an IP GRE tunnel, encapsulate the first packet with a first EVI Identity, and send the encapsulated first packet to the public network;
  wherein the first EVI Identity is added to a protocol type field after a GRE header of the IP GRE tunnel, and the first EVI Identity comprises: the corresponding EVI service instance ID and a first packet type identity.

12. The edge device according to claim 11, wherein the instructions are to cause the processor to:
  receive a second packet from a network side;
  decapsulate the second packet;
  obtain an IP GRE tunnel carried by the second packet;
  obtain a second EVI Identity according to a protocol type of the IP GRE tunnel;
  determine a type of the decapsulated second packet according to a second packet type identity in the second EVI Identity;
  if the decapsulated second packet is a protocol packet, send the decapsulated second packet to the CPU; and
  if the decapsulated second packet is a data packet, perform layer 2 forwarding for the decapsulated second packet in an EVI service instance corresponding to an EVI service instance ID in the second EVI Identity.

13. The method according to claim 5, wherein the encapsulating adds, in the first packet, the first EVI Identity to a protocol type field following a GRE header of the IP GRE tunnel, and the first EVI Identity comprises: the corresponding EVI service instance ID and a first packet type identity.

14. The method according to claim 1, wherein an EVI service instance of the different EVI service instances comprises a VLAN between sites.

15. The method according to claim 1, wherein a first entry of the entries associates a first port number and a first VLAN ID with a first EVI service instance ID, and a second entry of the entries associates a second port number and the first VLAN ID with a second EVI service instance ID, the second EVI service instance ID being different from the first EVI service instance ID.

16. The edge device according to claim 7, wherein the plurality of entries comprise an entry that associates a port number, a range of outer VLAN IDs, and a range of inner VLAN IDs to a respective EVI service instance ID.

17. The edge device according to claim 7, wherein the plurality of entries comprise an entry that associates a range of port numbers, an outer VLAN ID, and an inner VLAN ID to a respective EVI service instance ID.

18. The edge device according to claim 7, wherein the plurality of entries comprise an entry that associates a range of port numbers, a range of outer VLAN IDs, and a range of inner VLAN IDs to a respective EVI service instance ID.

* * * * *